(12) United States Patent
Chen et al.

(10) Patent No.: US 11,767,900 B2
(45) Date of Patent: Sep. 26, 2023

(54) SERVO AND ROBOT

(71) Applicant: ROBOSEN ROBOTICS (SHENZHEN) CO., LTD., Shenzhen (CN)

(72) Inventors: Xiaosen Chen, Beijing (CN); Liming Zheng, Beijing (CN)

(73) Assignee: ROBOSEN ROBOTICS (SHENZHEN) CO., LTD., Shenzhen (CN)

(*) Notice: Subject to any disclaimer, the term of this patent is extended or adjusted under 35 U.S.C. 154(b) by 0 days.

(21) Appl. No.: 17/882,497

(22) Filed: Aug. 5, 2022

(65) Prior Publication Data

US 2023/0055683 A1 Feb. 23, 2023

(30) Foreign Application Priority Data

Aug. 18, 2021 (CN) .......................... 202121934050.9

(51) Int. Cl.
| | |
|---|---|
| *F16H 1/20* | (2006.01) |
| *B25J 9/10* | (2006.01) |
| *F16H 57/031* | (2012.01) |
| *F16H 57/02* | (2012.01) |

(52) U.S. Cl.
CPC .................. *F16H 1/20* (2013.01); *B25J 9/10* (2013.01); *F16H 57/031* (2013.01); *F16H 2057/02034* (2013.01)

(58) Field of Classification Search
CPC ......... H02K 7/116; F16H 1/20; F16H 57/031; F16H 2057/02034; B25J 9/10
See application file for complete search history.

(56) References Cited

U.S. PATENT DOCUMENTS

| | | | |
|---|---|---|---|
| 9,163,700 B2 | 10/2015 | Schneider | |
| 2012/0302677 A1* | 11/2012 | Cristadoro | ........... C09D 177/06 524/100 |
| 2019/0097496 A1 | 3/2019 | Xiong et al. | |
| 2019/0181719 A1* | 6/2019 | Xiong | .................... H02K 7/003 |
| 2020/0233448 A1* | 7/2020 | Chen | .................... H02K 11/215 |
| 2021/0013780 A1* | 1/2021 | Yuan | ....................... H02K 7/116 |

FOREIGN PATENT DOCUMENTS

| | | |
|---|---|---|
| CN | 206332566 U | 7/2017 |
| CN | 207368815 U | 5/2018 |
| CN | 207534804 U | 6/2018 |
| CN | 207542942 U | 6/2018 |
| CN | 207616609 U | 7/2018 |
| CN | 207724303 U | 8/2018 |
| CN | 110429757 A | 11/2019 |
| CN | 209604482 U | 11/2019 |

(Continued)

*Primary Examiner* — Jake Cook

(74) *Attorney, Agent, or Firm* — Mauriel Kapouytian Woods LLP; Ran Pang; Liang Huang

(57) ABSTRACT

A servo includes: a servo body, an upper cover fixedly connected to the top of the servo body, a lower cover fixedly connected to the bottom of the servo body, and a direct-current motor, a motor gear and a gear set which are arranged between the servo body and the upper cover and in driving connection with one another in sequence. The servo further comprises a first part and a second part protruding from the first part, and the gear set comprises an output gear located at the second part.

13 Claims, 3 Drawing Sheets

(56) References Cited

FOREIGN PATENT DOCUMENTS

| | | | |
|---|---|---|---|
| CN | 209793734 | U | 12/2019 |
| EP | 2179909 | A2 | 4/2010 |
| JP | 2003500718 | A | 1/2003 |
| JP | 2015181804 | A | 10/2015 |
| JP | 2020067295 | A | 4/2020 |
| KR | 20170132009 | A | 12/2017 |
| WO | 2013062376 | A2 | 5/2013 |

* cited by examiner

SERVO AND ROBOT

CROSS-REFERENCE TO RELATED APPLICATION

This application claims priority to Chinese Patent Application No. CN202121934050.9, filed on Aug. 18, 2021, the content of which is incorporated herein by reference in its entirety for all purposes.

TECHNICAL FIELD

The present disclosure relates to the technical field of robot accessories, and particularly to a servo and a robot.

BACKGROUND

A servo is a power source for a remote control model or a humanoid robot or the like to control actions, and is also an important motion execution device that drives the motion of a joint of the robot. How to make the servo adaptable to a narrower space and improve its applicability is an important research and development for those skilled in the art.

SUMMARY

According to an aspect of the present disclosure, a servo is provided. The servo comprising: a servo body; an upper cover fixedly connected to the top of the servo body; a lower cover fixedly connected to the bottom of the servo body; and a direct-current motor, a motor gear, and a gear set which are arranged between the servo body and the upper cover and in driving connection with one another in sequence, wherein the servo comprises a first part and a second part protruding from the first part, and the gear set comprises an output gear located at the second part.

In some embodiments, the gear set further comprises a first-stage gear, a second-stage gear, a third-stage gear, a fourth-stage gear, and a transition gear which are in driving connection with one another in sequence, the motor gear meshes with the first-stage gear, and the output gear meshes with the transition gear.

In some embodiments, the motor gear, the first-stage gear, the second-stage gear, the third-stage gear, the fourth-stage gear, the transition gear and the output gear are arranged in a W shape.

In some embodiments, the upper cover is provided with a round hole in the second part; and the servo further comprises an insertable servo plate coaxially connected to the output gear and extending out of the round hole.

In some embodiments, a copper ring is provided between the output gear and the insertable servo plate.

In some embodiments, the servo body has an open cavity, and the bottom of the cavity is hollow.

In some embodiments, the servo further comprises: a printed circuit board and a potentiometer which are arranged between the servo body and the lower cover.

In some embodiments, the servo further comprises: electric wires soldered to the printed circuit board.

In some embodiments, the servo further comprises a printed circuit board and a potentiometer which are arranged between the servo body and the lower cover, and the potentiometer and the transition gear are coaxially arranged and are inserted into each other in an interference fit.

In some embodiments, the servo body, the upper cover and the lower cover are all housing structural members, first limiting structures are provided on an edge of the servo body and an edge of the upper cover, the first limiting structures being configured to limit the positions of the edge of the servo body and the edge of the upper cover relative to each other, and second limiting structures are provided on an edge of the servo body and an edge of the lower cover, the second limiting structures being configured to limit the positions of the edge of the servo body and the edge of the lower cover relative to each other.

In some embodiments, the first limiting structures comprise a limiting groove and a limiting protrusion, and the second limiting structures comprise a limiting groove and a limiting protrusion.

In some embodiments, each of the servo body, the upper cover and the lower cover has a wall thickness ranging from 0.8 mm to 2.5 mm.

In some embodiments, the servo body, the upper cover and the lower cover are made of nylon 66 with 30% glass fiber.

In some embodiments, the upper cover is fixedly connected to the servo body via screws, and the lower cover is fixedly connected to the servo body via screws.

According to an aspect of the present disclosure, a robot is provided. The robot comprising the servo according to any the foregoing embodiments.

DETAILED DESCRIPTION OF EMBODIMENTS

The following description is merely exemplary in nature and is not intended to limit the present disclosure, application, or uses. The specific embodiments of a servo of the present disclosure will be further described below with reference to the accompanying drawings of the specification.

The servo is mainly composed of a circuit board, a motor, a reduction gear set, a sensor, and a control circuit. The working principle of the servo is described as follows: a main control board of a robot sends a control signal to the servo; a single-chip microcomputer on the circuit board of the servo performs corresponding processing on the basis of the control signal and determines a direction of rotation, and then drives the motor, such as a direct-current brush motor, to start to rotate; the motor transmits power to an output gear through the reduction gear set, and at the same time, a position detection sensor detects a rotation angle of the output gear and sends a detection signal to the single-chip microcomputer; and the single-chip microcomputer determines whether the rotation of the output gear has reached a predetermined position on the basis of the detection signal of the position detection sensor.

It will be appreciated by the inventors of the present disclosure that some servos in the related art need to occupy a lot of internal space of robots, and thus they are not applicable to "thin arm" type humanoid robots and robots with forearms.

In view of this, a servo and a robot are provided in embodiments of the present disclosure, which can effectively alleviate or even eliminate the defects described above.

Figure 1:
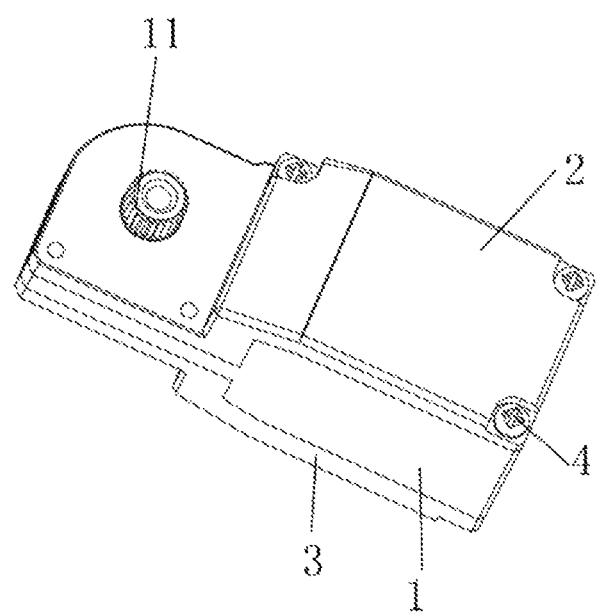
FIG. 1 is a perspective structural schematic diagram of a servo according to some embodiments of the present disclosure.
Figure 2:
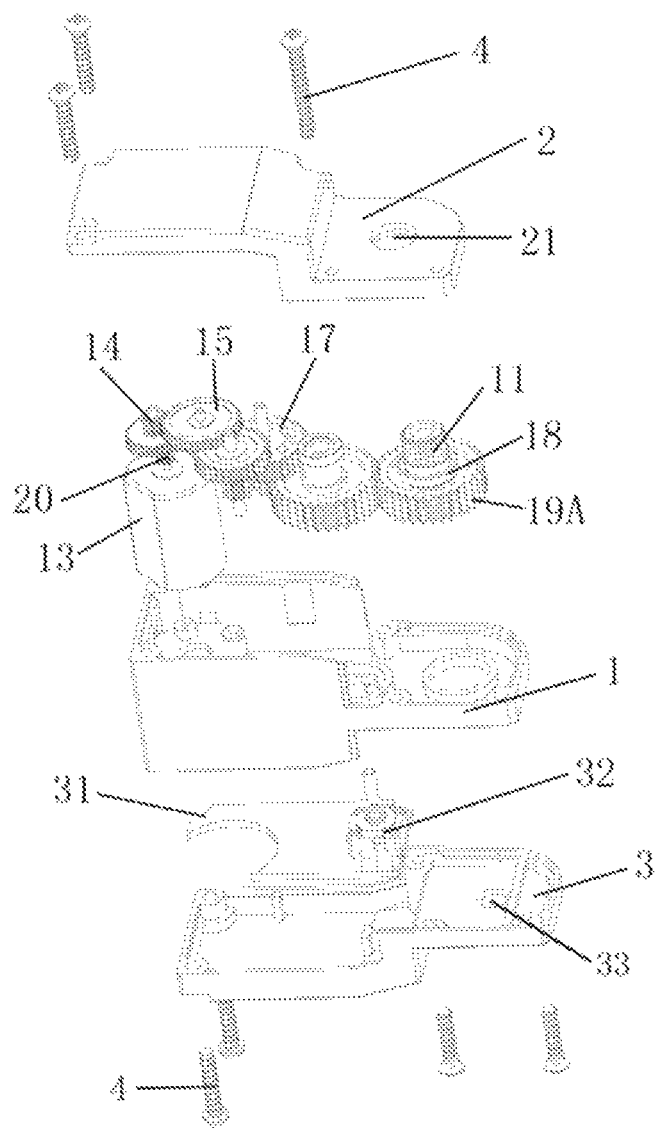
FIG. 2 is an exploded structural schematic diagram of a servo according to some embodiments of the present disclosure.
Figure 3:
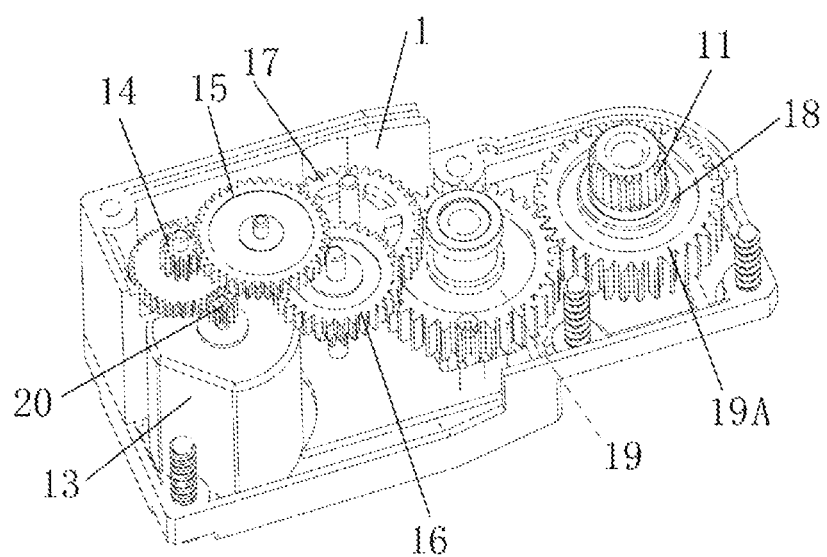
FIG. 3 is a schematic diagram of an internal structure of a servo according to some embodiments of the present disclosure.

As shown in FIGS. 1 to 3, FIG. 1 is a perspective structural schematic diagram of a servo according to some embodiments of the present disclosure, FIG. 2 is an exploded structural schematic diagram of the servo, and FIG. 3 is a schematic diagram of an internal structure of the servo.

The servo according to the embodiments of the present disclosure comprises: a servo body 1, an upper cover 2 fixedly connected to the top of the servo body 1, a lower cover 3 fixedly connected to the bottom of the servo body 1, and a direct-current motor 13, a motor gear 20 and a gear set which are arranged between the servo body 1 and the upper cover 2 and in driving connection with one another in sequence, wherein the servo comprises a first part and a second part protruding from the first part, and the gear set comprises an output gear 19A located at the second part.

The servo is in the shape of the Chinese character "凸" as a whole. For example, the second part is narrower than the first part, and the width change of the first part and the second part is designed to be better adaptable to a narrow space. For example, the servo can be applied to a "thin arm" type humanoid robot or a robot with forearms, and accordingly has a wide range of applications.

In the embodiments of the present disclosure, the servo body 1, the upper cover 2 and the lower cover 3 may all be housing structural members, which may be formed by an injection molding process. First limiting structures are provided on an edge of the servo body 1 and an edge of the upper cover 2 for limiting the positions of the edge of the servo body 1 and the edge of the upper cover 2 relative to each other, and second limiting structures are provided on an edge of the servo body 1 and an edge of the lower cover 3 for limiting the positions of the edge of the servo body 1 and the edge of the lower cover 3 relative to each other. The first limiting structures comprise a limiting groove and a limiting protrusion, and the second limiting structures comprise a limiting groove and a limiting protrusion. The design of the first limiting structures and the second limiting structures not only facilitates assembling between the housing structural members but also improves the accuracy of matching between the housing structural members.

In some embodiments, each of the servo body 1, the upper cover 2 and the lower cover 3 has a wall thickness ranging from 0.8 mm to 2.5 mm, and their materials may comprise at least one of polyamide and glass fiber. In some embodiments, the wall thicknesses of each of the servo body 1, the upper cover 2 and the lower cover 3 is designed to be 1.5 mm, and the servo body 1, the upper cover 2 and the lower cover 3 are all made of nylon 66 with 30% glass fiber.

In some embodiments, the upper cover 2 is fixedly connected to the servo body 1 via screws, and the lower cover 3 is fixedly connected to the servo body 1 via screws 4. In this way, the servo body 1, the upper cover 2 and the lower cover 3 are fixedly connected together, and are easy to be disassembled. In some embodiments, the upper cover 2 and the lower cover 3 are both provided with threaded holes, and the upper cover 2, the servo body 1 and the lower cover 3 are connected together via a plurality of screws 4 that pass through the threaded holes. Among the plurality of screws 4, a gap of 2.6 mm is reserved between the upper and lower screws near the direct-current motor 13, so that the torque and power can be increased, and a space for replacing the coreless motor is reserved.

As shown in FIG. 3, in some embodiments of the present disclosure, the gear set further comprises a first-stage gear 14, a second-stage gear 15, a third-stage gear 16, a fourth-stage gear 17 and a transition gear 19 which are in driving connection with one another in sequence for power transmission, wherein the motor gear 20 meshes with the first-stage gear 14, and the output gear 19A meshes with the transition gear 19. The first-stage gear 14, the second-stage gear 15, the third-stage gear 16, and the fourth-stage gear 17 may be made of iron, and the transition gear 19 and the output gear 19A may be made of an aluminum alloy.

The transition gear 19 is arranged between the fourth-stage gear 17 and the output gear 19A, so that it is easier to arrange the output gear 19A at a narrower end of the servo in the shape of the Chinese character "凸", making the shape of the servo more adaptable to a narrow space. In addition, the rotation of the output gear 19A can also be indirectly determined by detecting the rotation angle of the transition gear 19.

In some embodiments, a line connecting the centers of the motor gear 20, the first-stage gear 14, the second-stage gear 15, the third-stage gear 16, the fourth-stage gear 17, the transition gear 19 and the output gear 19A is roughly zigzag, for example, roughly W-shaped. With this arrangement, the gear set has a more compact structure, making the overall structure of the servo smaller, thereby saving the occupied internal space of the robot.

As shown in FIG. 1 and FIG. 2, in some embodiments, the upper cover 2 is provided with a round hole 21 in the second part, and the servo further comprises an insertable servo plate 11 coaxially connected to the output gear 19A and extending out of the round hole 21. In the embodiments, a copper ring 18 is provided between the output gear 19A and the insertable servo plate 11.

In some embodiments, the structural design of the gear set is as follows: the motor gear 20 meshes with the first-stage gear 14; a first-stage pinion is also mounted on a rotating shaft of the first-stage gear 14, and the first-stage pinion is located above the first-stage gear 14 and is coaxially connected to the first-stage gear 14; the first-stage pinion meshes with the second-stage gear 15, a second-stage pinion is sleeved over a rotating shaft of the second-stage gear 15, and the second-stage pinion is located under the second-stage gear 15 and is coaxially fixedly connected to the second-stage gear 15; the second-stage pinion meshes with the third-stage gear 16, a third-stage pinion is also sleeved over a rotating shaft of the third-stage gear 16, and the third-stage pinion is located under the third-stage gear 16 and is coaxially connected to the third-stage gear 16; the third-stage pinion meshes with the fourth-stage gear 17, a fourth-stage pinion is sleeved over a rotating shaft of the fourth-stage gear 17, and the fourth-stage pinion is located under the fourth-stage gear 17 and is coaxially fixedly connected to the fourth-stage gear 17; and the fourth-stage pinion meshes with the transition gear 19, and finally the transition gear 19 meshes with gear teeth of the output gear 19A. An output end of an output shaft of the output gear 19A passes through the upper cover 2 and is exposed outside the upper cover 2.

In some embodiments, each gear in the gear set is provided with a gear shaft having a different diameter, wherein the diameter of the gear shaft of the first-stage gear is 1.2 mm, the diameter of the gear shaft of the second-stage gear is 1.2 mm, the diameter of the gear shaft of the third-stage gear is 1.5 mm, and the diameter of the gear shaft of the fourth-stage gear is 1.5 mm. The diameter of an output shaft of the direct-current motor is 1 mm, and the diameter of the gear shaft of the output gear is 6.0 mm. The inventors of the present disclosure have found, through a large number of experiments, that the use of the gear set and the gear shafts having the corresponding diameters can minimize the shaft distance for all stages of reduction parts, thereby saving the space to the utmost extent and minimizing the volume of the entire servo.

As shown in FIG. 2, in some embodiments, the servo body 1 has an open cavity, and the bottom of the cavity is hollow, which not only makes the arrangement of the different stages of gears more compact, but also reduces the overall weight of the servo.

As shown in FIG. 2, in some embodiments, the servo further comprises a printed circuit board (PCB) 31 and a potentiometer 32 which are arranged between the servo body 1 and the lower cover 3.

The PCB 31 is soldered with electric wires, and signals are output or input through the electric wires. Compared with a plug-in connection mode, the use of terminals can be avoided, so that the occupied space can be saved as much as possible. The servo may use a series bus communication mode, and comprises three plug-in electric wires connected in cascade, so that the total number of electric wires of the robot can be reduced compared with a traditional PWM circuit. In some embodiments of the present disclosure, the thickness of the PCB 31 can be designed to be 1 mm, so that the PCB is adaptable to a motor with a larger current.

The potentiometer 32 may be configured to detect the rotation angle of the transition gear 19. The position of the output gear 19A can be indirectly determined on the basis of a detected value of the rotation angle of the transition gear 19. The potentiometer 32 may be a micro potentiometer, so that forearms of the robot can be continuously rotated 360°. The potentiometer 32 and the transition gear 19 are coaxially arranged and are inserted into each other in an interference fit. In some embodiments, the micro potentiometer is inserted into the transition gear 19 in an interference fit. A lower end of the transition gear 19 is inserted into the micro potentiometer in an interference fit, so that a structural member at the lower end of the transition gear 19 should be designed to have a certain elastic shape. A coupling may be arranged at the lower end of the transition gear 19, and the micro potentiometer is in an interference fit with the coupling. A lower section of the coupling may be designed to have a D-shaped boss, so that an impact force on the micro potentiometer can be reduced. The transition gear 19 may be made of an aluminum alloy material. The coupling has a relatively small diameter, and may be made of a metal material with a higher hardness, such as 304 stainless steel. The stainless steel coupling may be pressed, by a press, into the lower end of the transition gear 19 made of the aluminum alloy material.

In some embodiments, the potentiometer 32 is a potentiometer capable of realizing 360° continuous rotation and having an electrical range of 280°, which is provided with a D-shaped hole having a diameter of 1.6 mm and a depth of 5 mm. The D-shaped boss of the coupling has a diameter of 1.6 mm and a length of 2 mm. The coupling is machined from 304 stainless steel.

The servo provided by the embodiments of the present disclosure can be manually assembled. An assembling process comprises:

assembling the gear set and the direct-current motor 13 in the cavity of the servo body 1;

cooperating the direct-current motor 13 with the PCB 31 and the potentiometer 32, for example, electrically connecting the PCB 31 to the potentiometer 32 and then placing them in the lower cover 3, and electrically connecting the direct-current motor 13 to the PCB 31;

respectively snap-fitting the upper cover 2 and the lower cover 3 with the servo body 1, with the insertable servo plate 11 passing through the round hole 21 in the upper cover 2; and fixing the upper cover 2, the servo body 1 and the lower cover 3 together via a plurality of screws 4, thereby completing the assembling of the entire servo.

An electric screwdriver may be used during assembling, and the specification of the screws 4 is M2×10, for example. Grease may be added to the gear set during assembling.

In some embodiments, a wiring method of the servo is as follows: the electric wires such as lead wires are soldered to the PCB 31 in the lower cover 3, and the potentiometer 32 that has been fixed to the PCB 31 is connected to the transition gear 19 via the coupling; and the electric wires are led out from a through hole 33 formed in the lower cover 3.

For the servo using the above wiring method, a part of its electric wires may be hidden between the PCB 31 and the lower cover 3. On the one hand, the exposure of a lot of wires is avoided, which makes the appearance of the servo more attractive. On the other hand, the wires can also be protected, thereby prolonging the service life of the wires, and improving the performance stability of the servo.

The embodiments of the present disclosure further provide a robot, comprising the servo according to any one of the foregoing embodiments. In some embodiments, the robot comprises a left servo and a right servo, which are symmetrically arranged on a "thin arm" type humanoid robot. The left and right servos are of small structures, and gaps between them and joint parts can be reduced.

It is not difficult for those skilled in the art to understand that the technical solution of the present disclosure may include any combination of various parts in this specification. These combinations are not described in detail herein for the sake of conciseness of the specification. However, after reading this specification, the scope of the present disclosure, which is constituted by any combination of the parts in this specification, has been obvious.

What is claimed is:

1. A servo, comprising:
   a first structure area;
   a second structure area protruding from the first structure area;
   a servo body;
   an upper cover fixedly connected to a top of the servo body, wherein the upper cover is provided with a round hole in the second structure area;
   a lower cover fixedly connected to a bottom of the servo body;
   a direct-current motor, a motor gear, and a gear set which are arranged between the servo body and the upper cover and in driving connection with one another in sequence, wherein the gear set comprises an output gear located at the second structure area; and
   an insertable servo plate coaxially connected to the output gear and extending out of the round hole, wherein a copper ring is provided between the output gear and the insertable servo plate.

2. The servo according to claim 1, wherein:
   the gear set further comprises a first-stage gear, a second-stage gear, a third-stage gear, a fourth-stage gear, and a transition gear which are in driving connection with one another in sequence,
   the motor gear meshes with the first-stage gear, and the output gear meshes with the transition gear.

3. The servo according to claim 2, wherein:

the motor gear, the first-stage gear, the second-stage gear, the third-stage gear, the fourth-stage gear, the transition gear, and the output gear are arranged in an approximately zigzag shape.

4. The servo according to claim 1, wherein:

the servo body has an open cavity, and the bottom of the servo body is hollow.

5. The servo according to claim 1, further comprising:

a printed circuit board and a potentiometer which are arranged between the servo body and the lower cover.

6. The servo according to claim 5, further comprising:

electric wires soldered to the printed circuit board.

7. The servo according to claim 2, wherein:

the servo further comprises a printed circuit board and a potentiometer which are arranged between the servo body and the lower cover, and the potentiometer and the transition gear are coaxially arranged and are inserted into each other in an interference fit.

8. The servo according to claim 1, wherein:

the servo body, the upper cover and the lower cover are all housing structural members, first limiting structures are provided on an edge of the servo body and an edge of the upper cover, the first limiting structures being configured to limit positions of the edge of the servo body and the edge of the upper cover relative to each other, and second limiting structures are provided on another edge of the servo body and an edge of the lower cover, the second limiting structures being configured to limit positions of the edge of the servo body and the edge of the lower cover relative to each other.

9. The servo according to claim 8, wherein:

the first limiting structures comprise a limiting groove and a limiting protrusion, and the second limiting structures comprise a limiting groove and a limiting protrusion.

10. The servo according to claim 8, wherein:

each of the servo body, the upper cover, and the lower cover has a wall thickness ranging from 0.8 mm to 2.5 mm.

11. The servo according to claim 1, wherein:

the servo body, the upper cover, and the lower cover are made of nylon 66 with 30% glass fiber.

12. The servo according to claim 1, wherein:

the upper cover is fixedly connected to the servo body via screws, and the lower cover is fixedly connected to the servo body via screws.

13. A robot, comprising:

a servo according to claim 1.

* * * * *